United States Patent
Yuasa

(10) Patent No.: US 9,834,091 B2
(45) Date of Patent: Dec. 5, 2017

(54) CONTROL DEVICE FOR VEHICLE

(71) Applicant: TOYOTA JIDOSHA KABUSHIKI KAISHA, Toyota-shi, Aichi-ken (JP)

(72) Inventor: Ryohei Yuasa, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/309,860

(22) PCT Filed: May 12, 2015

(86) PCT No.: PCT/IB2015/000938
§ 371 (c)(1),
(2) Date: Nov. 9, 2016

(87) PCT Pub. No.: WO2015/173638
PCT Pub. Date: Nov. 19, 2015

(65) Prior Publication Data
US 2017/0144543 A1 May 25, 2017

(30) Foreign Application Priority Data
May 12, 2014 (JP) .................................. 2014-098973

(51) Int. Cl.
*B60K 23/04* (2006.01)
*F16H 59/66* (2006.01)
(Continued)

(52) U.S. Cl.
CPC ............ *B60K 23/04* (2013.01); *F16H 48/36* (2013.01); *F16H 59/66* (2013.01); *F16H 61/12* (2013.01);
(Continued)

(58) Field of Classification Search
CPC ... B60K 23/04; B60K 2023/043; F16H 48/36; F16H 59/66; F16H 61/12
See application file for complete search history.

(56) References Cited

U.S. PATENT DOCUMENTS 6,510,374 B1 * 1/2003 Saotome ................. F16H 59/66
477/107
2002/0002433 A1 * 1/2002 Matsuno ................ B60K 23/04
701/67
(Continued)

FOREIGN PATENT DOCUMENTS

JP 2009-299779 A 12/2009

*Primary Examiner* — Edwin A Young
(74) *Attorney, Agent, or Firm* — Oliff PLC

(57) ABSTRACT

A control device for a vehicle. The vehicle includes a drive power source, a first drive wheel, a second drive wheel, and a drive power distribution device. One of the first drive wheel and the second drive wheel is provided on the left side with respect to the traveling direction of the vehicle, and the other drive wheel is provided on the right side with respect to the traveling direction of the vehicle. The drive power distribution device distributes power from the drive power source to the first drive wheel and the second drive wheel. The control device includes an electronic control unit. The electronic control unit is configured to perform drive power distribution control. The drive power distribution control is control for distributing drive power to the first drive wheel and the second drive wheel by the drive power distribution device. The electronic control unit is configured to make a first variation of a control command value be smaller than a second variation of the control command value. The first variation is a variation per unit time of the control command value in the process of stopping the drive power distribution control when abnormality in the drive power distribution control occurs and a friction coefficient of a traveling road surface is great. The second variation is a variation per unit (Continued)

time of the control command value in the process of stopping the drive power distribution control when abnormality in the drive power distribution control occurs and the friction coefficient is small.

4 Claims, 8 Drawing Sheets

(51) Int. Cl.
  *F16H 61/12* (2010.01)
  *F16H 48/36* (2012.01)
(52) U.S. Cl.
  CPC .. *B60K 2023/043* (2013.01); *B60W 2510/125* (2013.01); *B60W 2720/14* (2013.01); *F16H 2048/368* (2013.01); *F16H 2061/1232* (2013.01)

(56) References Cited

U.S. PATENT DOCUMENTS

| | | |
|---|---|---|
| 2005/0085988 A1 | 4/2005 | Ushiroda et al. |
| 2013/0231837 A1* | 9/2013 | Holbrook ............... B60K 23/04 701/69 |

* cited by examiner

CONTROL DEVICE FOR VEHICLE

BACKGROUND OF THE INVENTION

1. Field of the Invention

The present invention relates to a control device for a vehicle including a drive power distribution device which distributes power from a drive power source to a right wheel and a left wheel.

2. Description of Related Art

In a vehicle including a drive power distribution device, a control device for a vehicle which executes drive power distribution control to control distribution of drive power to the right drive wheel and the left drive wheel by the drive power distribution device is well known. For example, a control device of a drive power distribution device described in Japanese Patent Application Publication No. 2009-299779 (JP 2009-299779 A) is known. JP 2009-299779 A discloses that fail-safe control for stopping the drive power distribution control by the drive power distribution device is executed when the failure of the drive power distribution device is determined.

SUMMARY OF THE INVENTION

On the other hand, if abnormality in the drive power distribution control occurs, unintended drive power distribution (right and left torque difference) is performed, and a moment different from that during a normal operation is likely to be generated in the vehicle. When such a moment is generated, if the drive power distribution control is stopped by uniform fail-safe control, the responsiveness of a vehicle behavior to the moment by abnormality is different due to a road surface state when abnormality occurs. Accordingly, drivability may be deteriorated. For example, when the road surface state is a high μ road, the responsiveness of the vehicle behavior to the moment by abnormality is excellent. Then, in order to recover such a vehicle behavior, a driver is supposed to perform a suitable steering operation. For this reason, when the road surface state is a high μ road, if the drive power distribution control is stopped quickly, the moment by abnormality is eliminated immediately after fail-safe control starts, and the moment of the vehicle primarily becomes a moment by the steering of the driver. When this happens, the recovery of the vehicle becomes faster than the intention of the driver, and drivability may be deteriorated. The problem described above is unknown.

The invention provides a control device for a vehicle capable of improving drivability in stopping drive power distribution control when abnormality in drive power distribution control by a drive power distribution device occurs.

An aspect of the invention relates to a control device for a vehicle. The vehicle includes a drive power source, a first drive wheel, a second drive wheel, and a drive power distribution device. One of the first drive wheel and the second drive wheel is provided on the left side with respect to the traveling direction of the vehicle, and the other drive wheel is provided on the right side with respect to the traveling direction of the vehicle. The drive power distribution device distributes power from the drive power source to the first drive wheel and the second drive wheel. The control device includes an electronic control unit. The electronic control unit is configured to perform drive power distribution control. The drive power distribution control is control for distributing drive power to the first drive wheel and the second drive wheel by the drive power distribution device. The electronic control unit is configured to make a first variation of a control command value be smaller than a second variation of the control command value. The first variation is a variation per unit time of the control command value in the process of stopping the drive power distribution control when abnormality in the drive power distribution control occurs and a friction coefficient of a traveling road surface is great. The second variation is a variation per unit time of the control command value in the process of stopping the drive power distribution control when abnormality in the drive power distribution control occurs and the friction coefficient is small.

With this configuration, the electronic control unit is configured to make the first variation of the control command value be smaller than the second variation of the control command value. For this reason, a situation of the recovery of the vehicle becoming faster than the intention of the driver when stopping the drive power distribution control quickly during traveling on a high μ road is suppressed. With this, the recovery of the vehicle becomes gentle during traveling on the high μ road. Therefore, when abnormality in the drive power distribution control by the drive power distribution device occurs, it is possible to improve drivability in stopping the drive power distribution control.

In the above-described aspect, the electronic control unit may be configured to make the first variation be smaller than the second variation when the control command value at the time of starting the stop of the drive power distribution control is greater than a predetermined value.

When the control command value at the time of starting the stop of the drive power distribution control is greater than the predetermined value, it is considered that there is a great difference in the degree of influence on the vehicle due to the difference in the variation per unit time of the control command value in the process of stopping the drive power distribution control. With this, the first variation is made smaller than the second variation, whereby the recovery of the vehicle reliably becomes gentle during traveling on the high μ road. Therefore, it is possible to improve drivability in stopping the drive power distribution control.

In the above-described aspect, the control command value may be a value output from the electronic control unit, and the drive power distribution device may be controlled based on the control command value. The electronic control unit may be configured to stop the drive power control when abnormality in the drive power distribution control occurs.

In the above-described aspect, the variation per unit time of the control command value in the process of stopping the drive power distribution control may be set based on the time until the drive power distribution control is stopped.

With this configuration, the variation per unit time of the control command value in the process of stopping the drive power distribution control is determined by the time until the drive power distribution control is stopped, whereby it is possible to simplify control for stopping the drive power distribution control.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
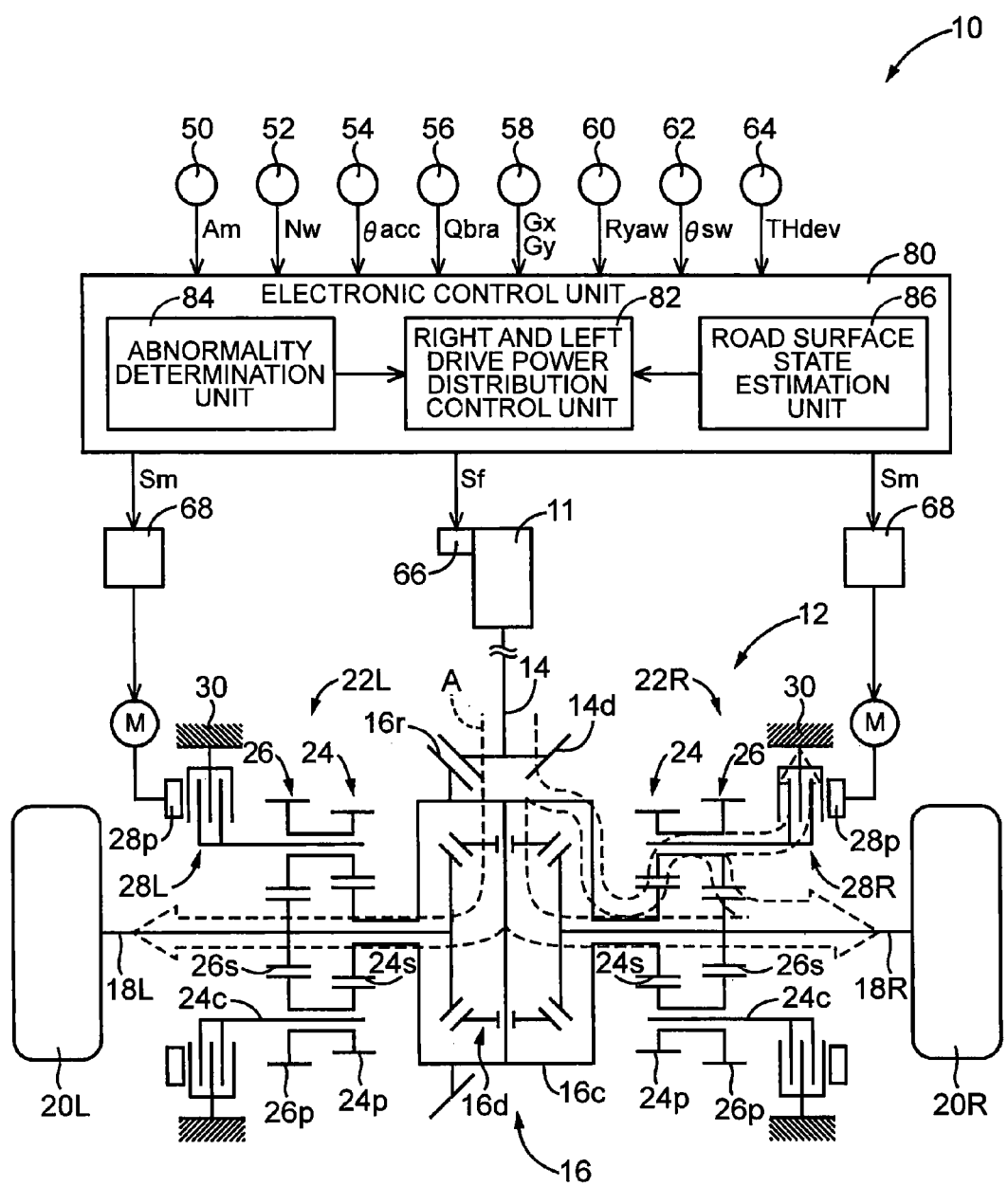
FIG. 1 is a diagram illustrating the schematic configuration of a drive power distribution device in a vehicle to which the invention is applied, and illustrating a main part of a control function and a control system for various kinds of control in the drive power distribution device.

Hereinafter, an example of the invention will be described in detail referring to the drawings.

FIG. 1 is a diagram illustrating the schematic configuration of a drive power distribution device 12 in a vehicle 10 to which the invention is applied, and is a diagram illustrating a main part of a control function and a control system for various kinds of control in the drive power distribution device 12. In FIG. 1, the vehicle 10 is, for example, an FR vehicle, a four-wheel drive vehicle, or the like. The vehicle 10 includes, for example, a drive power source 11, such as an engine. In the vehicle 10, power (when there is no particular distinction, synonymous with torque or force) from the drive power source 11 is transmitted to a propeller shaft 14. The drive power distribution device 12 includes a rear-wheel differential gear device 16 (hereinafter, referred to as a differential gear device 16), a right rear wheel axle 18R and a left rear wheel axle 18L, (hereinafter, when there is no particular distinction, referred to as axles 18), and the like. The drive power distribution device 12 distributes power from the drive power source 11 transmitted to the propeller shaft 14 from the differential gear device 16 to a right rear wheel 20R and a left rear wheel 20L, (hereinafter, when there is no particular distinction, referred to as rear wheels 20) as a right drive wheel and a left drive wheel through the right axle and the left axle 18.

The differential gear device 16 is a known bevel gear type differential gear mechanism which includes a differential case 16c and a differential mechanism 16d made of a bevel gear, and transmits rotation while applying differential rotation to the right axle and the left axle 18. The differential case 16c is provided with a ring gear 16r which meshes with the drive pinion 14d provided at the tip of the propeller shaft 14. Accordingly, power from the drive power source 11 transmitted to the propeller shaft 14 is transmitted from the drive pinion 14d to the differential case 16c through the ring gear 16r.

The drive power distribution device 12 further includes a right speed increasing device 22R and a left speed increasing device 22L, (hereinafter, when there is no particularly distinction, referred to as speed increasing devices 22) between the differential case 16c and the right axle and the left axle 18. The speed increasing devices 22L, 22R are constituted bilaterally symmetrically. Accordingly, the same members provided in the speed increasing devices 22L, 22R are represented by the same reference numerals.

The right speed increasing device and the left speed increasing device 22 include a right first planetary gear device and a left first planetary gear device 24, a right left second planetary gear device and a left second planetary gear device 26, a right clutch 28R and a left clutch 28L, (hereinafter, when there is no particular distinction, referred to as clutches 28), and a right motor and a left motor M. The first planetary gear device 24 and the second planetary gear device 26 are provided in parallel around the axis of the axle 18. The first planetary gear device 24 is arranged on the differential gear device 16 side, and the second planetary gear device 26 is arranged on the rear wheel 20 side. The clutch 28 is a multiplate clutch which is provided around the axis of the axle 18. The clutch 28 includes a piston 28p which is moved along the axial direction of the axle 18 with the rotation of the motor M, and changes in engagement force when being pressed by the piston 28p. That is, the clutch 28 changes in engagement force by the angle of the motor M, the drive torque of the motor M, the drive current of the motor M, or the like.

The first planetary gear device 24 includes a sun gear 24s, and a plurality of planetary gears 24p which mesh with the sun gear 24s. The second planetary gear device 26 includes a sun gear 26s, and a plurality of planetary gears 26p which mesh with the sun gear 26s. In addition, the first planetary gear device 24 and the second planetary gear device 26 include a common carrier 24c which rotatably and revolvably supports the planetary gears 24p and the planetary gears 26p.

In the first planetary gear device 24 and the second planetary gear device 26, the sun gear 24s is connected to the differential case 16c and rotates integrally with the differential case 16c. The sun gear 26s is connected to the axle 18 and rotates integrally with the axle 18. The planetary gears 24p and the planetary gears 26p are provided integrally. The carrier 24c is selectively connected to a housing 30 as a non-rotary member through the clutch 28. The number of teeth ZS1 of the sun gear 24s is greater than the number of teeth ZS2 of the sun gear 26s, and the number of teeth ZP2 of the planetary gears 26p is greater than the number of teeth ZP1 of the planetary gears 24p.

In the drive power distribution device 12 configured as above, if both the right clutch and the left clutch 28 are released, distribution of drive power is performed to the right rear wheel and the left rear wheel 20 only through the differential gear device 16. Also, when the clutch 28 is subjected to engagement control (in particular, slip control), the torque of the differential case 16c is transmitted to the axle 18 and the rear wheel 20 through the speed increasing device 22 on the side on which the clutch 28 is subjected to engagement control. That is, the rotation of the carrier 24c on the side on which the clutch 28 is subjected to engagement control is restricted, whereby torque for increasing the rotation speed of the rear wheel 20 on the side on which the clutch 28 is subjected to engagement control is generated, and the drive power of the rear wheel 20 on the side on which the clutch 28 is subjected to engagement control increases. The increase in drive power causes a relative decrease in drive power of the rear wheel 20 on the side on which the clutch 28 is not subjected to engagement control. For example, when the right clutch 28R is subjected to engagement control with predetermined engagement torque in order to increase the drive torque of the right rear wheel 20R, as indicated by a broken-line arrow A in FIG. 1, a part of torque transmitted to the differential case 16c is transmitted to the right rear wheel 20R through the right speed increasing device 22R, and the remaining part of torque is distributed to the right rear wheel 20R and the left rear wheel 20L, by the differential gear device 16. An electronic control unit 80 described below subjects either of the right clutch and the left clutch 28 to engagement control with predetermined engagement torque to increase the drive torque of the rear wheel 20 on the side on which one of the clutch 28 is subjected to engagement control and to relatively decrease the drive torque of the rear wheel 20 side on which one of the clutch 28 is not subjected to engagement control, thereby controlling right and left drive power distribution. That is, the electronic control unit 80 can execute drive power distribution control to control distribution of drive power to the right rear wheel and the left rear wheel 20 by the drive power distribution device 12.

The vehicle 10 includes the electronic control unit 80 which includes a control device of the vehicle 10 configured to execute, for example, drive power distribution control. The electronic control unit 80 includes, for example, a so-called microcomputer including a CPU, a RAM, a ROM, an input/output interface, and the like, and the CPU performs signal processing according to a program stored in advance in the ROM while using a temporary storage function of the RAM, thereby executing various kinds of control of the vehicle 10. For example, the electronic control unit 80 executes output control of the drive power source 11, drive power distribution control by the drive power distribution device 12, or the like, and is divided into a drive power source control part, a drive power distribution control part, and the like as necessary.

The electronic control unit 80 is supplied with various measured values (for example, a rotation angle Am of the motor M, respective wheel speeds Nw corresponding to respective wheel speeds Nwfl, Nwfr, Nwrl, and Nwrr of the right front wheel and left front wheel (not shown) and the right rear wheel 20R and the left rear wheel 20L, an accelerator opening θacc, a brake operation amount Qbra which is an operation amount of a brake operation member to be operated by the driver in order to actuate a known wheel brake device, a front and rear acceleration Gx of the vehicle 10, a right and left acceleration Gy of the vehicle 10, a yaw rate Ryaw which is a rotation angular velocity around the vertical axis of the vehicle 10, a steering angle θsw and a steering direction of the steering wheel, a device temperature THdev corresponding to the temperature of a CPU or the like in the electronic control unit 80, and the like) based on detection signals from various sensors (for example, a motor rotation angle sensor 50, a wheel speed sensor 52, an accelerator opening sensor 54, a brake sensor 56, a G sensor 58, a yaw rate sensor 60, a steering sensor 62, various temperature sensors 64, and the like) in the vehicle 10. Also, a drive power source output control command signal Sf as a control command value for the output control of the drive power source 11, a motor control command signal Sm as a control command value for controlling the motor M, and the like are respectively output from the electronic control unit 80 to the drive power source drive device 66 configured to drive the drive power source 11, a motor drive circuit 68 configured to drive the motor M, and the like. The electronic control unit 80 calculates the speed V (hereinafter, referred to as a vehicle speed V) of the vehicle 10 as one of various measured values based on the respective wheel speeds Nw. The electronic control unit 80 sets the average wheel speed of the respective wheel speeds Nw as the vehicle speed V.

The electronic control unit 80 includes drive power distribution control means, that is, a drive power distribution control unit 82 and abnormality determination means, that is, an abnormality determination unit 84.

The drive power distribution control unit 82 executes the drive power distribution control by the drive power distribution device 12. As an example of the drive power distribution control, the drive power distribution control unit 82 controls a yaw moment such that appropriate turning performance is obtained during turning traveling. Specifically, the drive power distribution control unit 82 calculates a target yaw rate Ryawtgt based on the vehicle speed V, the steering angle θsw, the accelerator opening θacc, and the like from a relationship (for example, a calculation expression, a data map, or the like) found and stored in advance experimentally or in design (defined in advance). The drive power distribution control unit 82 calculates a necessary yaw moment amount (necessary yaw moment amount) based on the target yaw rate Ryawtgt and an actual yaw rate Ryaw from the predefined relationship. The drive power distribution control unit 82 calculates a target right and left drive power difference (in order words, target drive power distribution) necessary for obtaining the necessary yaw moment amount from the predefined relationship. The drive power distribution control unit 82 calculates the clutch torque of the clutch 28 of the speed increasing device 22 on a driver power increasing side, on which the target drive power distribution is obtained, from the predefined relationship. The drive power distribution control unit 82 calculates a target rotation angle Amtgt of the motor M, at which the clutch torque of the clutch 28 on the driver power increasing side, from the predefined relationship, and outputs a motor control command signal Sm for setting an actual rotation angle Am of the motor M as the target rotation angle Amtgt to the motor drive circuit 68.

As a control amount when setting the actual rotation angle Am of the motor M as the target rotation angle Amtgt, for example, there are the rotation angle Am of the motor M, the drive torque of the motor M, the drive current of the motor M, and the like. When the drive power distribution control is executed by feedback control, it is preferable that the rotation angle Am of the motor M or the drive torque of the motor M is used as a control amount. When the drive power distribution control is executed by open control (feedforward control), it is preferable that the driver current of the motor M is used as a control amount. Accordingly, the motor control command signal Sm which becomes an instruction value to an actuator (in this case, the motor M) at the time of feedback control becomes a target value, such as the target rotation angle Amtgt or a target drive torque of the motor M at which the target rotation angle Amtgt is obtained. The motor control command signal Sm which becomes an instruction value to the motor M at the time of open control becomes an output instruction value, such as the drive current of the motor M output from the motor drive circuit 68 so as to set the target rotation angle Amtgt. Also, the drive power distribution control may be executed by either feedback control or open control defined in advance, or the drive power distribution control may be executed based on a predefined form in which feedback control and open control are used.

The abnormality determination unit 84 determines whether or not abnormality in the drive power distribution control by the drive power distribution device 12 occurs. Abnormality in the drive power distribution control is, for example, abnormality of the motor control command signal Sm itself, abnormality of an actual value (actual response) of a control amount to the motor control command signal Sm, or the like. The drive power distribution control unit 82 executes fail-safe processing described below on the assumption that abnormality of the motor M itself or sticking of the clutch 28 does not occur. As a factor for the occurrence of abnormality of the motor control command signal Sm (the instruction value to the motor M) itself, since the instruction value is a value which is calculated by the electronic control unit 80, a calculation error due to RAM alteration that a written value to the RAM differs from a predetermined value due to the influence of, for example, noise or the like is assumed. In the case of such a calculation error, the electronic control unit 80 itself is normal. Accordingly, when abnormality of the motor control command signal Sm itself occurs, the execution of fail-safe processing described below is effective. For example, if RAM alteration occurs in the processing of calculating an instruction value, and a correct instruction value is abnormal, it is considered that a final value is corrected and a correct instruction value is output. Meanwhile, when the final value of the instruction value undergoes RAM alteration, it is not possible to output a correct instruction value. Accordingly, the execution of fail-safe processing described below is effective. Also, as a factor for the occurrence of abnormality of a measured value of a control amount to the motor control command signal Sm, for example, abnormality of the motor M itself or abnormality of various sensors in the vehicle 10 is assumed. In the case of abnormality of various sensors, if an instruction value is output, the motor M is actuated as the instruction value. Accordingly, the execution of fail-safe processing described below is effective. In contrast, in the case of abnormality of the motor M itself or abnormality of the clutch 28 itself, actuation is not performed as the instruction value. Accordingly, it is not necessary to execute fail-safe processing described below. For this reason, in this example, abnormality in the drive power distribution control does not include abnormality of the motor M itself or abnormality of the clutch 28 itself.

Specifically, the electronic control unit 80 functionally includes a diagnostic device (diagnosis) which determines whether or not the drive power distribution control by the drive power distribution device 12 is normally performed or detects an abnormal pace causing abnormality when the drive power distribution control is not normally performed. The abnormality determination unit 84 determines whether or not abnormality in the drive power distribution control occurs based on the diagnosis result by the diagnostic device. A traveling state in which abnormality in the drive power distribution control occurs includes not only a traveling state in which desired drive power distribution is not made when only one of the right clutch and the left clutch 28 is subjected to engagement control with predetermined engagement torque, but also a traveling state in which drive power distribution only through the differential gear device 16 is not made when both the right clutch and the left clutch 28 are controlled in a released state (that is, the drive power distribution control is apparently executed by abnormality, and the drive torque is relatively increased in one drive wheel).

When the abnormality determination unit 84 determines that abnormality in the drive power distribution control occurs, the drive power distribution control unit 82 executes fail-safe processing for stopping the drive power distribution control. Stopping the drive power distribution control refers to cancelling the traveling state in which the drive torque in one drive wheel of the right rear wheel 20R and the left rear wheel 20L, is relatively increased by the speed increasing device 22, that is, a state in which both the right clutch and the left clutch 28 are released. That is, stopping the drive power distribution control includes not only stopping the drive power distribution control during execution, but also stopping the drive power distribution control which is apparently executed by abnormality.

On the other hand, if a road surface state (road surface μ value) is different, it is considered that the responsiveness of a vehicle behavior to a yaw moment generated due to abnormality is different. Also, in order to recover a vehicle behavior according to the yaw moment generated due to abnormality, the driver is supposed to perform a suitable steering operation. For this reason, if the drive torque in one drive wheel which is relatively increased by uniform fail-safe processing at the time of the occurrence of abnormality is decreased, drivability may be deteriorated or a sense of discomfort may occur. A result of examination of a vehicle behavior at the time of abnormality due to a difference in a road surface μ value will be described below. In the following description, an abnormality detection time is a time from when abnormality occurs until the abnormality determination unit 84 determines that abnormality in the drive power distribution control occurs. When the abnormality detection time becomes long, the fail-safe processing starts late. Also, an output stop time is a time until the drive power distribution control is stopped, a time from when it is determined that abnormality occurs and the fail-safe processing starts until the output of the drive torque in one drive heel which is relatively increased by the speed increasing device 22 is stopped, that is, a torque decrease time from when the fail-safe processing starts until the drive torque relatively increased is decreased to a zero value. When the output stop time becomes short, a yaw moment (hereinafter, referred to as a yaw moment by failure) by drive torque (hereinafter, referred to as failure torque) in one drive wheel relatively increased by the speed increasing device 22 with the occurrence of abnormality is quickly eliminated. A peak yaw rate is a maximum value of the yaw moment by failure. Also, an aftershock yaw rate is a yaw moment when a yaw moment (hereinafter, referred to as a yaw moment by corrected steering) by a steering operation of the driver to recover a vehicle behavior with the yaw moment by failure is added to the yaw moment by failure.

Figure 2:
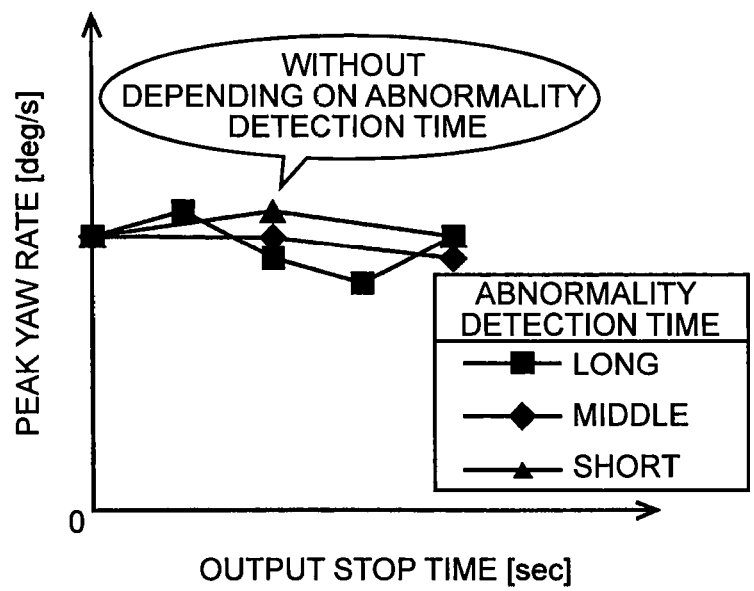
FIG. 2 is a diagram showing the magnitude of a peak yaw rate with respect to an output stop time at each of a plurality of abnormality detection times on a high μ road.
Figure 3:
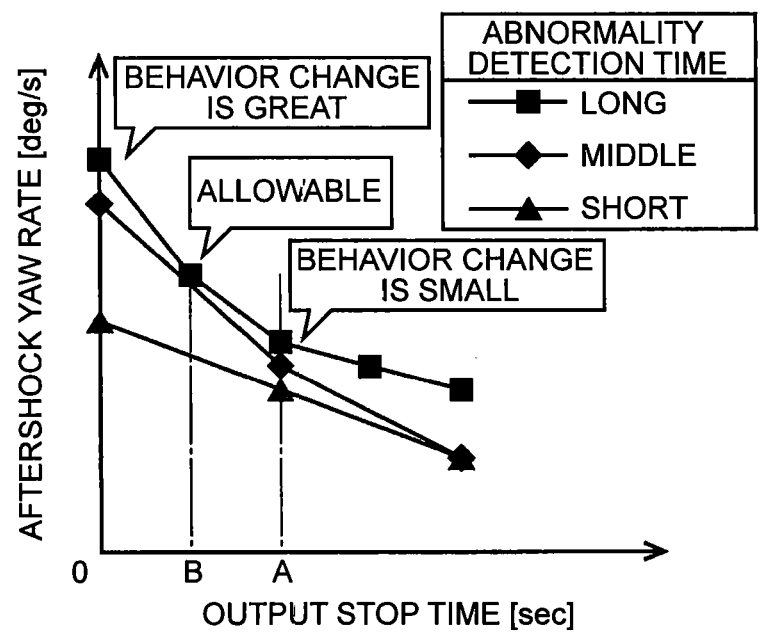
FIG. 3 is a diagram showing the magnitude of an aftershock yaw rate with respect to an output stop time at each of a plurality of abnormality detection times on a high μ road.
Figure 4:
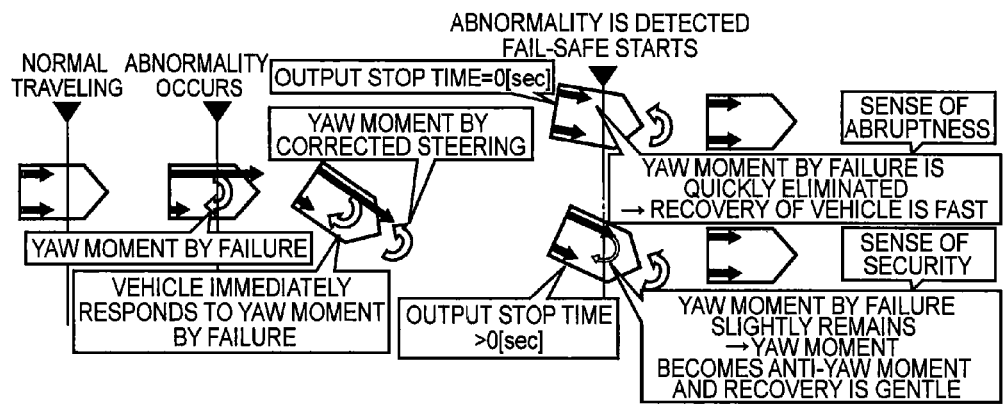
FIG. 4 is a diagram illustrating comparison of a vehicle behavior on a high μ by a difference in an output stop time.

FIG. 2 is a diagram showing the magnitude of a peak yaw rate with respect to an output stop time at each of a plurality of abnormality detection times on a high μ road. FIG. 3 is a diagram showing the magnitude of an aftershock yaw rate with respect to an output stop time at each of a plurality of abnormality detection times on a high μ road. FIG. 4 is a diagram illustrating comparison of a vehicle behavior on a high μ road by a difference in an output stop time. As shown in FIG. 2, the peak yaw rate has small change depending on the length of the abnormality detection time after abnormality occurs, and also has small change depending on the output stop time. In relation to this, as shown in FIG. 4, the responsiveness of a vehicle behavior to the yaw moment by failure is high. As shown in FIG. 3, the aftershock yaw rate tends to be small when the output stop time is long. In relation to this, as shown in FIG. 4, when the output stop time is 0 [sec], the yaw moment by failure is quickly eliminated, and the recovery of the vehicle behavior becomes fast with the yaw moment by corrected steering. In contrast, when there is a certain output stop time, the yaw moment by failure slightly remains and this yaw moment becomes an anti-yaw moment to the yaw moment by corrected steering, and the recovery of the vehicle behavior becomes gentle. If the recovery of the vehicle behavior becomes fast, the drive may feel a sense of abruptness. Meanwhile, if the recovery of the vehicle behavior becomes gentle, the driver is supposed to feel a sense of security. As a result of sensory evaluation on this, as shown in FIG. 3, it is desirable that the output stop time is equal to or greater than A [sec] regardless of the abnormality detection time if possible, and should be equal to or greater than B [sec].

Figure 5:
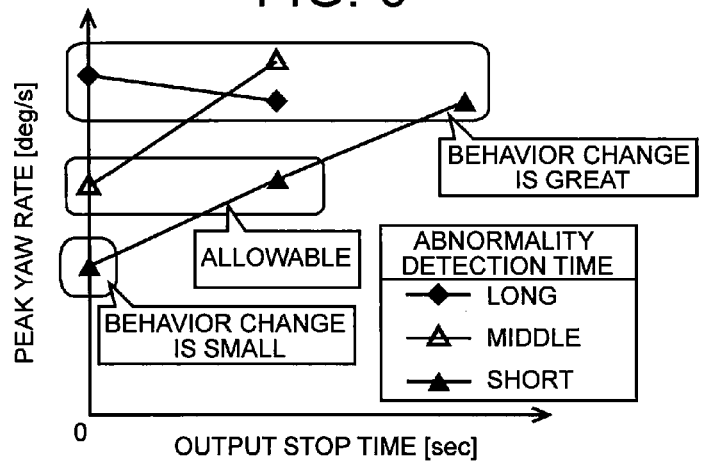
FIG. 5 is a diagram showing the magnitude of a peak yaw rate with respect to an output stop time at each of a plurality of abnormality detection times on a low μ road.
Figure 6:
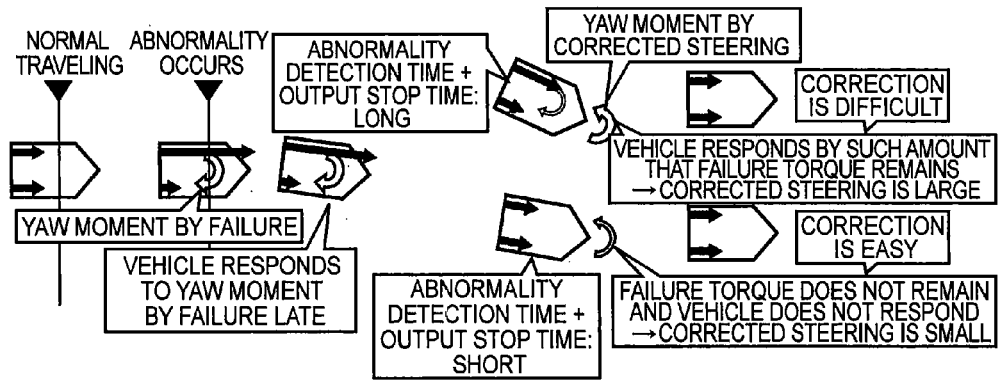
FIG. 6 is a diagram illustrating comparison of a vehicle behavior on a low μ road by a difference in a total time of an abnormality detection time and an output stop time.

FIG. 5 is a diagram showing the magnitude of a peak yaw rate with respect to an output stop time at each of a plurality of abnormality detection times on a low μ road. FIG. 6 is a diagram illustrating comparison of a vehicle behavior on a low μ road by a difference in a total time of an abnormality detection time and an output stop time. As shown in FIG. 5, the peak yaw rate after abnormality occurs tends to be small when the abnormality detection time is short and the output stop time is long. That is, the peak yaw rate after abnormality occurs is the total time of the abnormality detection time and the output stop time, and tends to be small when a torque generation time (=abnormality detection time+output stop time) for which failure torque is generated is short. In relation to this, as shown in FIG. 6, the responsiveness of a vehicle behavior to the yaw moment by failure is low. Also, when the torque generation time is long, the vehicle behavior changes with the yaw moment by failure by the remaining amount of failure torque, and corrected steering by the driver becomes great. In contrast, when the torque generation time is short, failure torque hardly remains, and the vehicle behavior hardly changes with the yaw moment by failure. Accordingly, corrected steering by the driver becomes small. If great corrected steering is required, the driver may hardly correct the vehicle behavior. If small corrected steering is satisfactory, the driver is supposed to easily correct the vehicle behavior. As a result of sensory evaluation on this, as shown in FIG. 5, it is desirable that the abnormality detection time is within a middle-short time.

Figure 7:
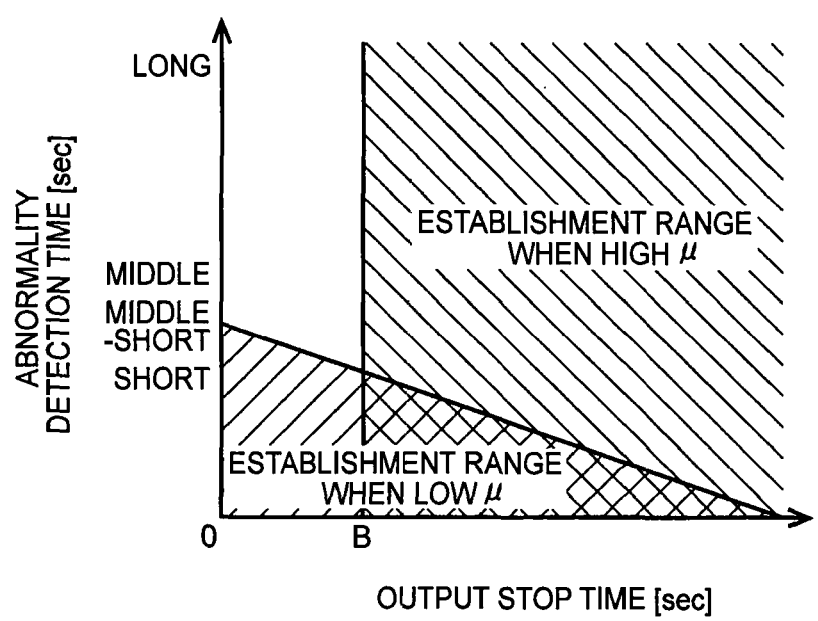
FIG. 7 is a diagram showing an establishment range of fail-safe processing based on sensory evaluation by the relationship between an output stop time and an abnormality detection time for a road surface μ value.

FIG. 7 is a diagram showing an establishment range of fail-safe processing based on sensory evaluation by the relationship between an output stop time and an abnormality detection time for each road surface μ value. In FIG. 7, based on the examination result described above, the establishment range of fail-safe processing on the high μ road is a region where the output stop time is equal to or greater than B [sec]. Also, the establishment range of fail-safe processing on the low μ road is a region where the torque generation time (=abnormality detection time+output stop time) is short. Here, as the abnormality detection time, a certain time is required in consideration of detection accuracy or the like, and it is appropriate to set the same value regardless of the road surface state. For this reason, the abnormality detection time is defined to a time within a range between a middle-short time and a short time in advance. For this reason, the output stop time during fail-safe processing on the low μ road is defined to a time shorter than B [sec] in advance. Also, the output stop time during fail-safe processing on the high μ road is defined to a time equal to or greater than B [sec].

When the fail-safe processing is executed by a long output stop time, even if the yaw moment by failure is quickly decreased immediately after the fail-safe processing start, and thereafter, is slowly decreased, the long output stop time can be satisfied. However, in such an form, immediately after the fail-safe processing starts, a difference from when the fail-safe processing is executed by a short output stop time is small. For this reason, in the fail-safe processing, it is desirable to take an output stop time defined in advance to sweep down an instruction value (motor control command signal Sm) at a substantially constant rate of change. Accordingly, when abnormality in the drive power distribution control occurs, the drive power distribution control unit 82 makes a variation per unit time of the motor control command signal Sm in the process of stopping the drive power distribution control (that is, during the fail-safe processing) be smaller when the value (that is, the road surface μ value) of a friction coefficient of a traveling road surface upon the occurrence of abnormality is great than when the value of the friction coefficient is small. Also, the drive power distribution control unit 82 sets the variation (that is, change speed) per unit time of the motor control command signal Sm during the fail-safe processing based on the output stop time. With this, the fail-safe processing can be simplified.

Figure 8:
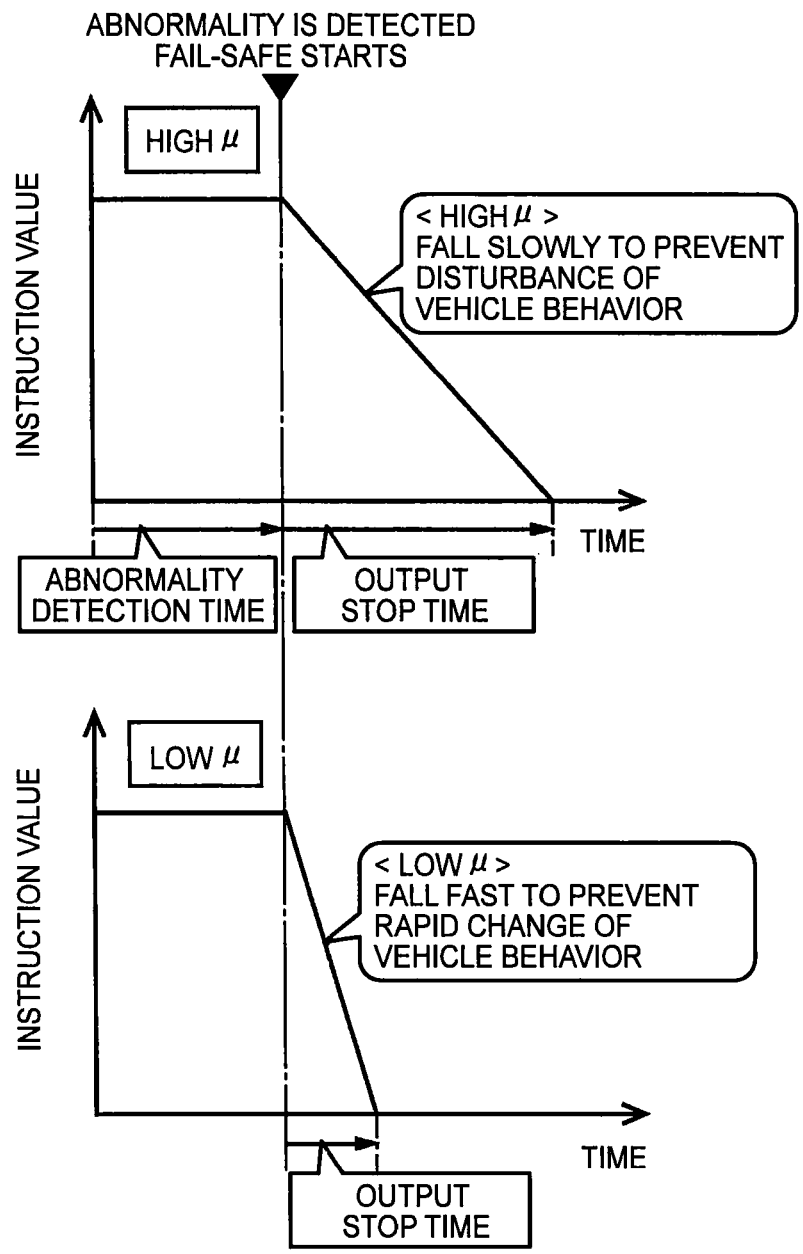
FIG. 8 is a diagram showing an example of an embodiment in which fail-safe processing is switched based on a road surface state.

FIG. 8 is a diagram showing an example of an embodiment in which fail-safe processing is switched based on a road surface state. In FIG. 8, in the fail-safe processing on the high μ road, the output stop time becomes comparatively long, whereby the change speed of the motor control command signal Sm becomes slow. With this, the motor control command signal Sm falls slowly. Accordingly, disturbance of a vehicle behavior is suppressed. In the fail-safe processing on the low μ road, the output stop time becomes comparatively short, whereby the change speed of the motor control command signal Sm becomes fast. With this, the motor control command signal Sm falls fast. Accordingly, rapid change of a vehicle behavior is suppressed.

Figure 9:
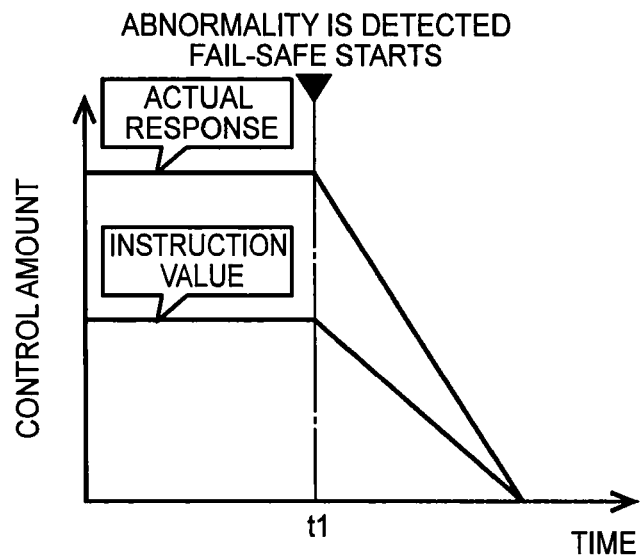
FIG. 9 is a diagram showing a method of changing an instruction value during fail-safe processing.
Figure 10:
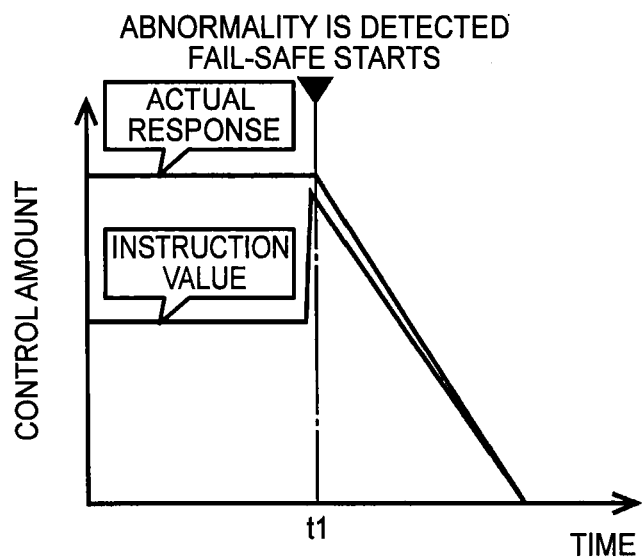
FIG. 10 is a diagram showing a method of changing an instruction value during fail-safe processing and showing a form different from FIG. 9.

FIGS. 9 and 10 are diagrams showing an example of a method of changing an instruction value during fail-safe processing. In FIGS. 9 and 10, an instruction value does not match an actual response (actual value). Accordingly, abnormality is detected at the time t1 and the fail-safe processing starts. An embodiment shown in FIG. 9, an instruction value falls directly. Also, in an embodiment shown in FIG. 10, an instruction value is multiplied by a value of an actual response after and then falls. In FIGS. 9 and 10, an instruction value may be an abnormal value, an actual response may be an abnormal value, or both of an instruction value and an actual response may be abnormal values. Also, as described above, a control amount is a control amount when the actual rotation angle Am of the motor M is set as the target rotation angle Amtgt. For example, in the case of feedback control, the control amount is the rotation angle Am of the motor M, the drive torque of the motor M, or the like, and in the case of open control, the control amount is the drive current of the motor M or the like.

Specifically, the electronic control unit 80 further includes road surface state estimation means, that is, a road surface state estimation unit 86. The road surface state estimation unit 86 calculates, for example, an estimated value of a road surface μ value. Specifically, the road surface state estimation unit 86 determines whether or not a predetermined wheel speed difference as a predefined low μ road determination threshold value for determining that the road surface μ value should be switched from a basic μ value to a low μ value is generated between the respective wheels based on the respective wheel speeds Nw when the accelerator is on. Also, the road surface state estimation unit 86 determines whether or not any one of the rates of change of of respective wheel speeds Nw exceeds a predetermined rate of change in wheel speed as the low μ road determination threshold value based on the respective wheel speeds Nw during the actuation of the wheel brake device. When it is determined that the predetermined wheel speed difference is generated between the respective wheels, or when it is determined that any one of the rates of change of the respective wheel speeds Nw exceeds the predetermined rate of change in wheel speed, the road surface state estimation unit 86 switches the estimated value of the road surface μ value from the basic μ value to the low μ value. The road surface state estimation unit 86 determines whether or not a composite G of the front and rear acceleration Gx and the right and left acceleration Gy exceeds a predetermined acceleration as a predefined high p road determination threshold value for determining that the road surface μ value should be switched from the basic μ value to a high μ value based on the front and rear acceleration Gx and the right and left acceleration Gy when the accelerator is on. When it is determined that the composite G exceeds the predetermined acceleration, the road surface state estimation unit 86 switches the estimated value of the road surface μ value from the basic μ value to the high μ value. After switching the estimated value of the road surface μ value from the basic μ value to the low μ value or the high μ value, the road surface state estimation unit 86 converges the estimated value of the road surface μ value to the basic μ value under the condition that the above-described switching determination is not performed.

When the abnormality determination unit 84 determines that abnormality in the drive power distribution control occurs, the drive power distribution control unit 82 sets the change speed of the motor control command signal Sm during the fail-safe processing to be lower when the estimated value of the road surface μ value calculated by the road surface state estimation unit 86 is the high μ value than when the estimated value of the road surface μ value is the low μ value.

Figure 11:
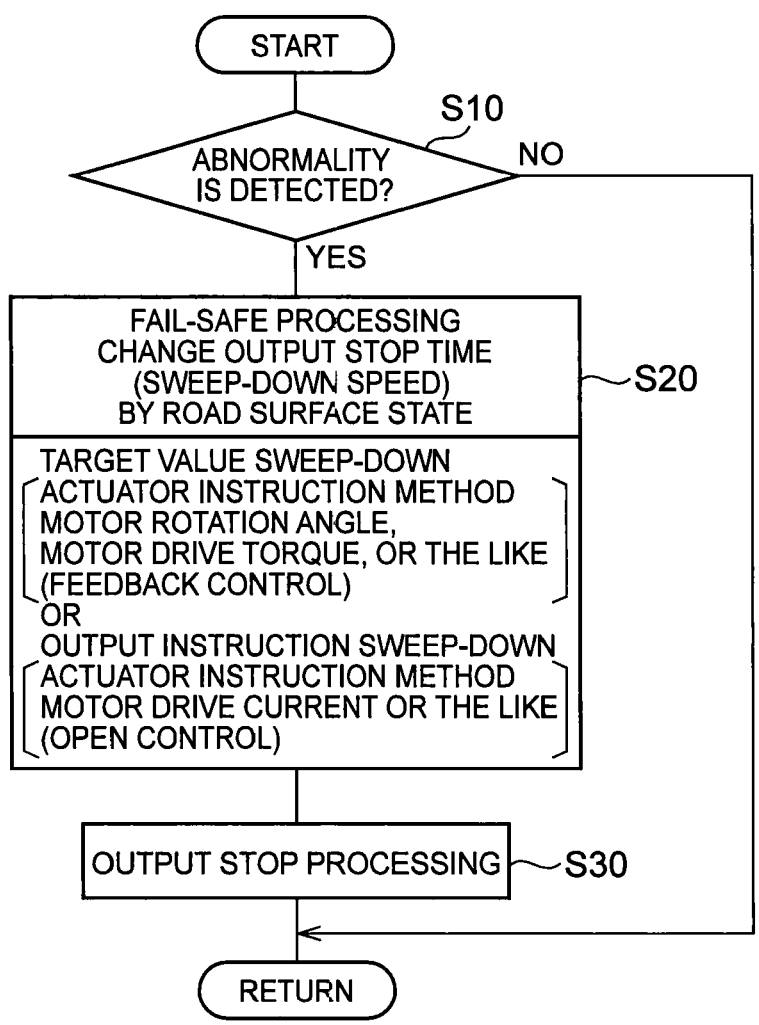
FIG. 11 is a flowchart illustrating a main part of control actuation of an electronic control unit, that is, control actuation for improving drivability in stopping the drive power distribution control when abnormality in drive power distribution control by a drive power distribution device 12 occurs.

FIG. 11 is a flowchart illustrating a main part of control actuation of the electronic control unit 80, that is, control actuation for improving drivability in stopping the drive power distribution control when abnormality in the drive power distribution control by the drive power distribution device 12 occurs, and is repeatedly executed at an extremely short cycle time of, for example, about several msec to tens of msec.

In FIG. 11, first, in Step (hereinafter, Step will be omitted) S10 corresponding to the abnormality determination unit 84, for example, it is determined whether or not abnormality in the drive power distribution control by the drive power distribution device 12 occurs. When the determination of S10 is negative, this routine ends. When the determination of S10 is affirmative, in S20 corresponding to the drive power distribution control unit 82, the fail-safe processing is executed. In the fail-safe processing, for example, when the estimated value of the road surface μ value is the high μ value, the motor control command signal Sm is swept down slowly at a comparatively low change speed (see FIG. 8). Also, in the fail-safe processing, for example, when the estimated value of the road surface μ value is the low μ value, the motor control command signal Sm is swept down fast at a comparatively high change speed (see FIG. 8). Also, for example, when the drive power distribution control is executed by feedback control, the fail-safe processing is also executed by feedback control, and the target value, such as the target rotation angle Amtgt or the target drive torque of the motor M, is swept down. For example, when the drive power distribution control is executed by open control, the fail-safe processing is also executed by open control, and the output instruction value, such as the drive current of the motor M, is swept down. However, the invention is not limited thereto as long as the feedback control and the open control can be replaced when the fail-safe processing starts. Next, in S30 corresponding to the drive power distribution control unit 82, the output of failure torque is stopped.

As described above, according to this example, the variation per unit time of the control command value during the fail-safe processing is set to be smaller when the road surface μ value upon the occurrence of the abnormality is great than when the road surface μ value is small. Accordingly, a situation of the recovery of the vehicle 10 becoming faster than the intention of the driver when the drive power distribution control is stopped quickly during traveling on the high μ road is suppressed, and the recovery of the vehicle 10 becomes gentle during traveling on the high μ road. Therefore, when abnormality in the drive power distribution control by the drive power distribution device 12 occurs, it is possible to improve drivability in stopping the drive power distribution control.

According to this example, the change speed of the motor control command signal Sm during the fail-safe processing is set based on the output stop time in the fail-safe processing. Therefore, control for stopping the drive power distribution control can be simplified.

Next, another example of the invention will be described. In the following description, the common portions to the examples are represented by the same reference numerals, and description thereof will be omitted.

In Example 1 described above, in the case of the high μ value, the change speed of the motor control command signal Sm during the fail-safe processing is set to a low value uniformly compared to the case of the low μ value. In the case of the high μ value, when the value of the motor control command signal Sm at the time of starting the fail-safe processing is small originally, even if the motor control command signal Sm is decreased at the same change speed as the case of the low μ value, it is considered that the degree of influence on the vehicle 10 described referring to FIGS. 2 to 4 is small. That is, it is considered that setting the change speed of the motor control command signal Sm during the fail-safe processing to a low value uniformly in the case of the high μ value compared to the case of the low μ value may be executed when the value of the motor control command signal Sm at the time of starting the fail-safe processing is large to a certain extent. Accordingly, in this example, in addition to Example 1 described above, when the value of the motor control command signal Sm at the time of starting the stop of the drive power distribution control (the time of starting the fail-safe processing) is greater than a predetermined value, the drive power distribution control unit 82 sets the variation per unit time of the motor control command signal Sm during the fail-safe processing to be smaller when the road surface μ value upon the occurrence of abnormality is great than when the road surface μ value is small. The predetermined value is a predefined high μ processing determination threshold value for determining that the value of the motor control command signal Sm is greater at the time of starting the fail-safe processing such an extent that the degree of influence on the vehicle 10 is not negligible if the variation per unit time of the motor control command signal Sm during the fail-safe processing becomes great.

Figure 12:
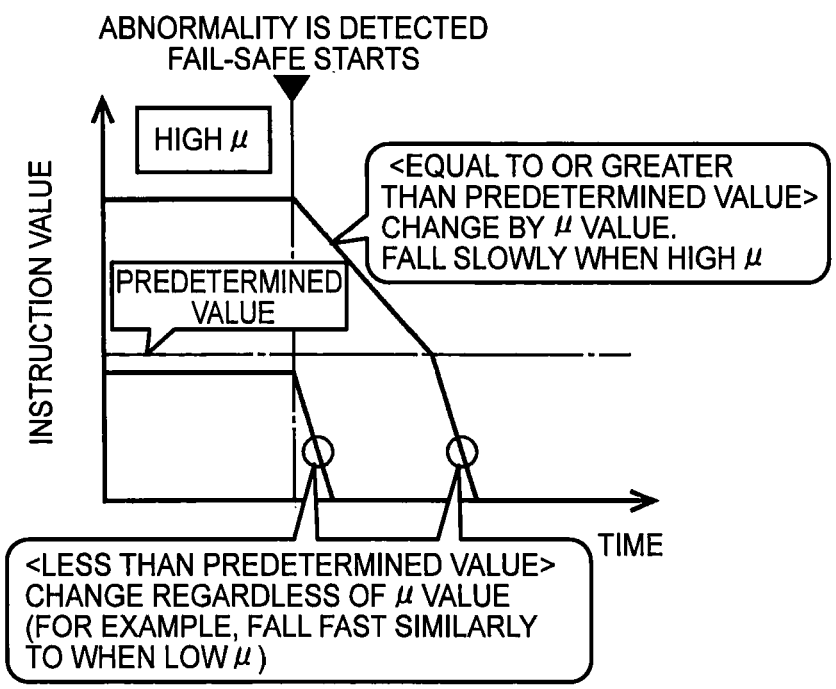
FIG. 12 is a diagram showing an example of an embodiment of fail-safe processing which is performed in the case of a high μ value.

FIG. 12 is a diagram showing an example of an embodiment of fail-safe processing which is performed in the case of a high μ value. In FIG. 12, if the value of the motor control command signal Sm at the time of starting the fail-safe processing is greater than the predetermined value, the change speed of the motor control command signal Sm during the fail-safe processing changes depending on the road surface value. Accordingly, in the fail-safe processing on the high μ road, when the value of the motor control command signal Sm at the time of starting the fail-safe processing is greater than the predetermined value, the motor control command signal Sm falls slowly. If the value of the motor control command signal Sm at the time of starting the fail-safe processing is equal to or less than the predetermined value, the change speed of the motor control command signal Sm during the fail-safe processing does not depend on the road surface μ value, and becomes a uniform value like the fail-safe processing on the low μ road. Accordingly, even in the fail-safe processing on the high μ road, when the value of the motor control command signal Sm at the time of starting the fail-safe processing is equal to or less than the predetermined value, similarly to the low μ road, the motor control command signal Sm falls fast.

As described above, according to this example, in addition to the same effects as in Example 1 described above being obtained, when the value of the motor control command signal Sm at the time of starting the fail-safe processing is greater than the predetermined value, the variation per unit time of the motor control command signal Sm during the fail-safe processing is set to be smaller when the road surface μ value upon the occurrence of abnormality is great than when the road surface μ value is small. Accordingly, when the value of the motor control command signal Sm at the time of starting the fail-safe processing is greater than the predetermined value, it is considered that there is a great difference in the degree of influence on the vehicle 10 due to the difference in the change speed of the motor control command signal Sm during the fail-safe processing. From this, the variation per unit time of the motor control command signal Sm during the fail-safe processing is set to be smaller when the road surface μ value is great than when the road surface μ value is small, whereby the recovery of the vehicle 10 becomes gentle reliably during traveling on the high μ road. Therefore, it is possible to improve drivability in stopping the drive power distribution control.

Although the examples of the invention have been described in detail based on the drawings, the invention may be embodied by combining the examples and may be applied to other forms.

For example, in the above-described examples, although the fail-safe processing starts immediately after abnormality occurs, and the variation per unit time of the motor control command signal Sm is set to be smaller in the case of the high μ road than the case of the low μ road, the invention is not limited to this form. For example, the variation per unit time of the motor control command signal Sm may not change between the high μ road and the low μ road, and a waiting time from when abnormality is detected until the fail-safe processing starts may be longer on the high μ road than the low μ road. In such an embodiment, the output stop time from when abnormality is detected until the fail-safe processing is completed changes according to the waiting time. Accordingly, even if the variation per unit time of the motor control command signal Sm is substantially the same, in the process of stopping the drive power distribution control from the detection of abnormality as a whole, the variation per unit time of the motor control command signal Sm changes according to the waiting time. Therefore, even in the above-described embodiment, the variation per unit time of the motor control command signal Sm in the process of stopping the drive power distribution control is set to be smaller when the road surface μ value upon the occurrence of abnormality in the drive power distribution control is great than when the road surface μ value is small.

In the above-described examples, as shown in FIG. 4 or 6, although the state of the occurrence of abnormality has been described in an embodiment in which drive power in one drive wheel is increased due to abnormality during straight traveling, the invention is not limited thereto. For example, the state of the occurrence of abnormality, in which a desired drive state is not reached, is assumed during turning traveling in a state in which the drive power distribution control by the drive power distribution device 12 is not performed, during turning traveling in a state in which the drive power distribution control by the drive power distribution device 12 is performed. The invention may be applied to when abnormality occurs.

In the above-described examples, although when the road surface μ value is great and when the road surface μ value is low refer to the high μ value when the road surface μ value is greater than the basis μ value and the low μ value when the road surface μ value is less than the basic μ value, and the embodiment of the fail-safe processing is divided into the high μ value and the low μ value, the invention is not limited thereto. For example, the fail-safe processing may be divided into a plurality of high μ values and low μ values, and the output stop time of each μ value may be defined in advance. Also, when the road surface μ value is the basic μ value, the same fail-safe processing as the high μ value may be executed. Also, the basic μ value may not be provided at all.

In the above-described examples, although the vehicle 10 is an FR vehicle or a four-wheel drive vehicle, the invention is not limited thereto. For example, the vehicle 10 may be an FF vehicle or a RR vehicle. In summary, the invention may be applied to any vehicle as long as the vehicle includes the drive power distribution device 12. Also, although the drive power distribution device 12 includes the speed increasing device 22, the invention is not limited thereto. For example, the drive power distribution device 12 is a drive power distribution device of a type in which power transmitted to an intermediate shaft of the axle is transmitted to the right drive wheel and the left drive wheel through the right clutch and the left clutch while passing through the right axle and the left axle connected to the intermediate shaft. Also, the drive power distribution device 12 may be a drive power distribution device of a type in which respective electric motors are connected to the right drive wheel and the left drive wheel and the right drive wheel and the left drive wheel are driven by the electric motors. In summary, the drive power distribution device 12 may be a drive power distribution device which distributes power from the drive power source 11 to the right drive wheel and the left drive wheel.

In the above-described examples, although an engine has been illustrated as the drive power source 11, the invention is not limited thereto. For example, although a gasoline engine or a diesel engine, such as an internal-combustion engine, is used as the drive power source 11, another type of prime mover, such as an electric motor, may be used alone or in combination with the engine.

It is to be understood that the above description is a mere embodiment, and that the invention may be embodied with various changes or improvements based on the knowledge of those skilled in the art.

What is claimed is:

1. A control device for a vehicle, the vehicle including a drive power source, a first drive wheel, a second drive wheel, and a drive power distribution device, one of the first drive wheel and the second drive wheel being provided on a left side with respect to a traveling direction of the vehicle, the other wheel is provided on a right side with respect to the traveling direction of the vehicle, and the drive power distribution device distributing power from the drive power source to the first drive wheel and the second drive wheel, the control device comprising:
  an electronic controller configured to
  (a) perform drive power distribution control, the drive power distribution control being control for distributing the drive power to the first drive wheel and the second drive wheel by the drive power distribution device, and
  (b) make a first variation of a control command value be smaller than a second variation of the control command value, the first variation being a variation per unit time of the control command value in a process of stopping the drive power distribution control when abnormality in the drive power distribution control occurs and a friction coefficient of a traveling road surface is great, and the second variation is a variation per unit time of the control command value in the process of stopping the drive power distribution control when abnormality in the drive power distribution control occurs and the friction coefficient is small.

2. The control device according to claim 1, wherein the electronic controller is configured to make the first variation be smaller than the second variation when the control command value at the time of starting the stop of the drive power distribution control is greater than a predetermined value.

3. The control device according to claim 1, wherein the control command value is a value output from the electronic controller, and the drive power distribution device is controlled based on the control command value, and
  the electronic controller is configured to stop the drive power control when abnormality in the drive power distribution control occurs.

4. The control device according to claim 1, wherein the variation per unit time of the control command value in the process of stopping the drive power distribution control is set based on the time until the drive power distribution control is stopped.

* * * * *